Jan. 15, 1957 R. D. PITTS ET AL 2,777,158
POULTRY PICKING MACHINE
Filed Feb. 21, 1955 4 Sheets-Sheet 1

INVENTOR.
FLOURNOY COREY
BY & ROBERT D. PITTS

Flournoy Corey
ATTORNEY

Jan. 15, 1957 R. D. PITTS ET AL 2,777,158
POULTRY PICKING MACHINE
Filed Feb. 21, 1955 4 Sheets-Sheet 3

INVENTOR.
FLOURNOY COREY
BY & ROBERT D. PITTS

*Flournoy Corey*
ATTORNEY.

Jan. 15, 1957 R. D. PITTS ET AL 2,777,158
POULTRY PICKING MACHINE
Filed Feb. 21, 1955 4 Sheets-Sheet 4
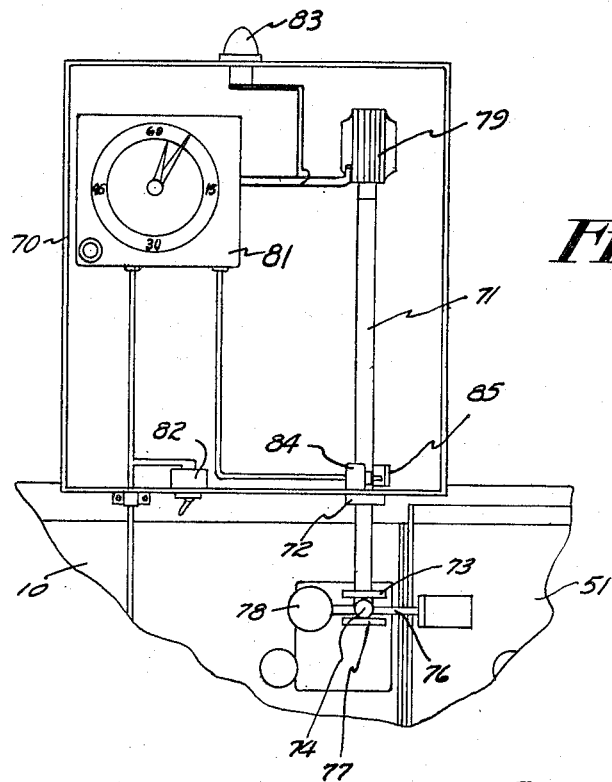
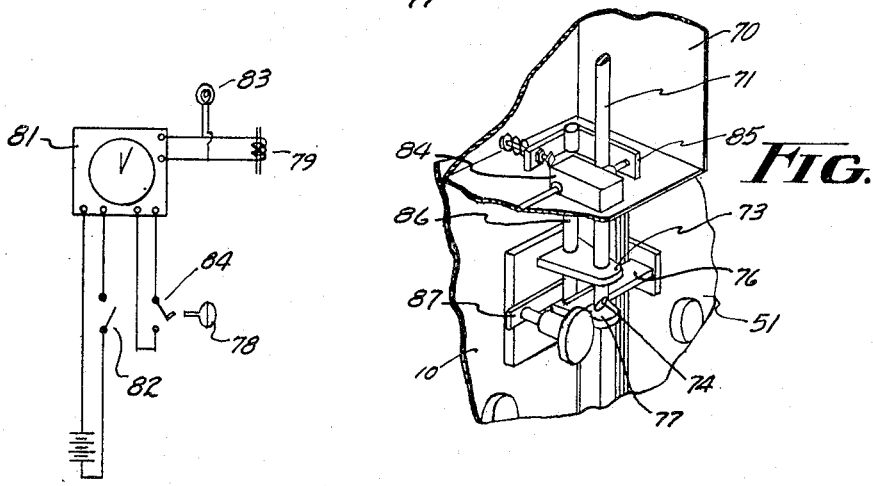
INVENTOR.
FLOURNOY COREY
BY & ROBERT D. PITTS
*Flournoy Corey*
ATTORNEY

United States Patent Office 2,777,158
Patented Jan. 15, 1957

2,777,158
POULTRY PICKING MACHINE

Robert Donald Pitts and Flournoy Corey, Cedar Rapids, Iowa, assignors to Pickwick Company, Cedar Rapids, Iowa, a corporation of Iowa Application February 21, 1955, Serial No. 489,468

8 Claims. (Cl. 17—11.1)

This invention relates to poultry processing equipment and has particular relation to a new and novel defeathering machine.

In poultry defeathering or picking machines known to the art, it is customary to employ a drum with substantially radially projecting fingers and to rotate this drum and apply the birds to the fingers to remove the feathers. In other words, only one set of rotating fingers is employed at any one time.

It is one of the objects of our invention, however, to employ a stationary set of fingers or rubbing members as well as a rotating set of rubbing members, and to so organize the members and position the bird that both the stationary and rotating rubbing members are effective in removing the feathers.

Another primary object of our invention is to provide a means and method of defeathering poultry in which the bird is moved and applied to stationary fingers to effect removal of the feathers in contrast to methods usually employed.

More specifically, it is an object of our invention to move one or more birds against the inner ends of stationary frictional feather engaging members arranged peripherally about and extending inwardly from a generally cylindrical enclosure. This has as an object to provide a considerably greater working surface of the defeathering members, or in other words, a greater number of picking fingers, in contact with the body of each bird. It also permits a number of birds to be applied to the defeathering members simultaneously.

Another important object of our invention is to provide a new and novel system of removing feathers in which the rotating member may be maintained in rotation and the birds removed from the machine by timed releasing means.

Another object of our invention is to provide a new and novel timing and releasing mechanism for poultry processing equipment such as poultry picking machines.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

Figure 5 is a view in front elevation of the control mechanism for timing the dressing operation and releasing the door at the conclusion of a selected time.

Figure 6 is a schematic diagram of the electric circuit employed for the control apparatus shown in Figure 5, and Figure 7 is a view in perspective of the latch and latch actuating and release mechanism, shown in Figures 1, 3 and 5.

Figure 1:
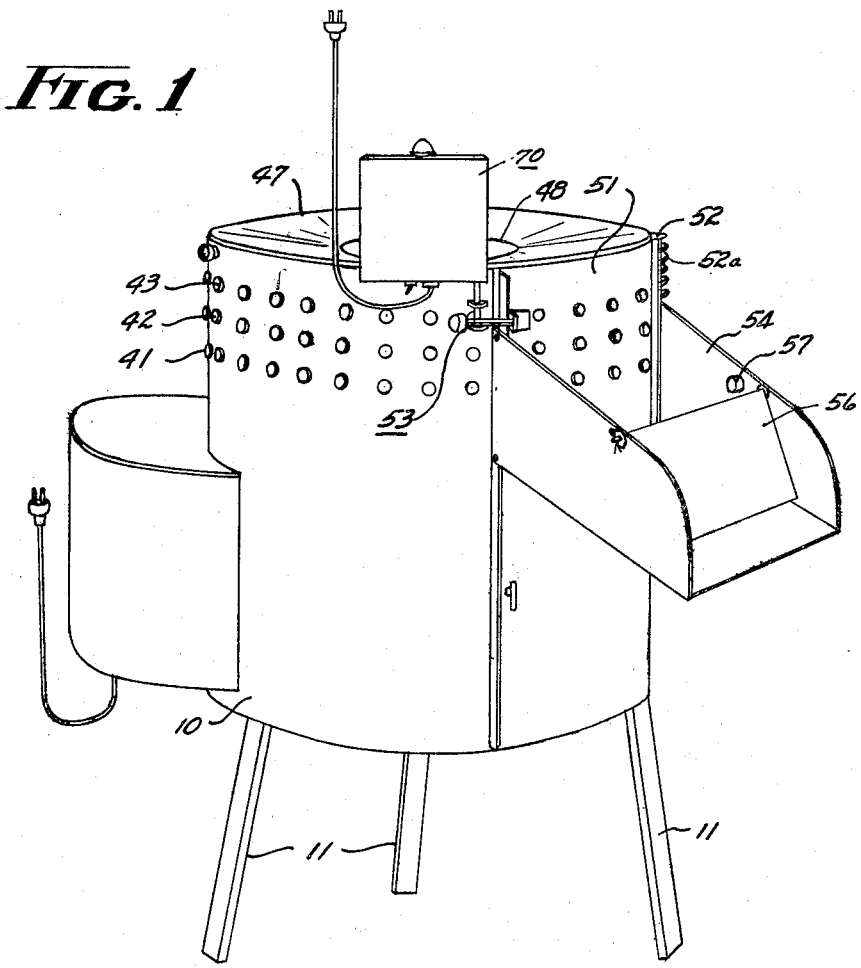
Figure 1 illustrates a poultry defeathering device constructed in accordance with one embodiment of our invention.
Figure 2:
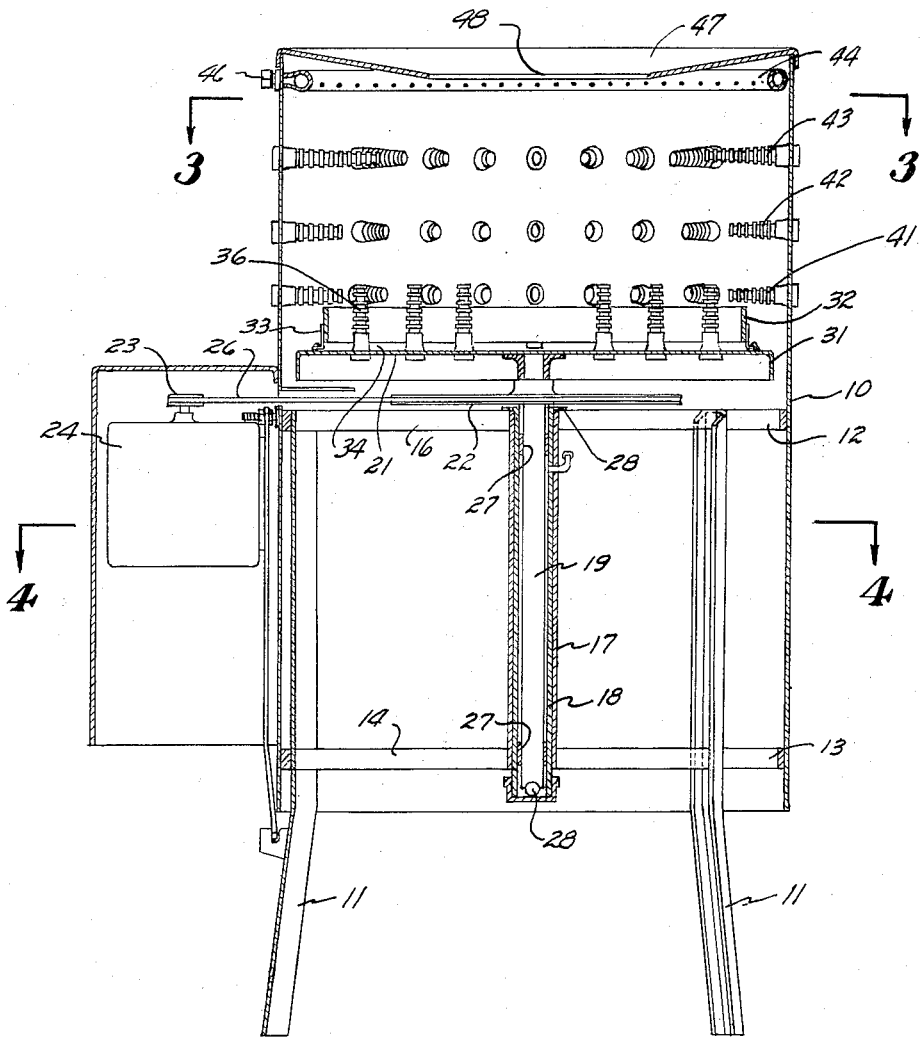
Figure 2 is a view in vertical section of the machine shown in Figure 1.
Figure 3:
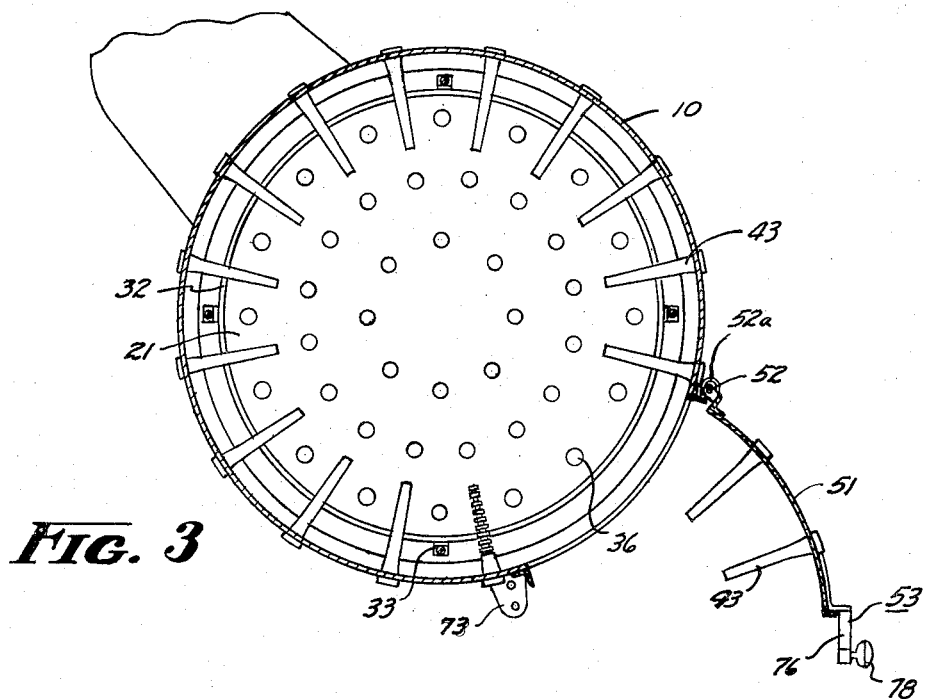
Figure 3 is a plan view of the interior of the tub of the machine shown in Figure 1, with the door in opened position and the top removed.
Figure 4:
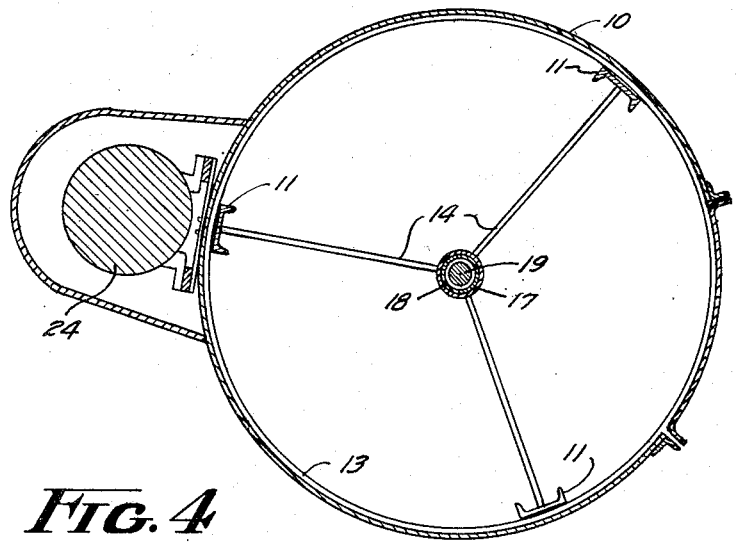
Figure 4 is a view in horizontal section of the lower portion of the machine and illustrating the drive shaft and relation of the supporting legs and the motor mounting.

Referring now to the drawings, and more particularly to Figures 1 and 2 for the present; a device constructed according to a preferred embodiment of our invention includes a cylindrical main body or tube 10, preferably supported on three legs 11, which legs are mounted on and secured to the inner wall of the cylinder, and which flare slightly outwardly, as illustrated, for better support of the machine.

The legs 11 are attached to a pair of rings 12 and 13 which form reinforcements for the lower portion of the cylinder 10. Three radially positioned support arms at the bottom of the cylinder, as indicated at 14, and at the top of the cylinder, as indicated at 16, support the large diameter tube 17 in which a smaller bearing tube 18 is located. Inside of this tube is a circular platform or disc shaft or drive shaft 19 at the upper end of which the disc or circular platform 21 is mounted. A drive pulley 22 is also mounted on the drive shaft 19, and this drive pulley 22 is driven by means of the pulley 23 of the driving motor 24 through the agency of the belt 26. The shaft 19 is supported for free rotation in the bearing tube by the sleeve bearings located at 27 and thrust bearing at 28.

The disc or circular platform 21 preferably has a downturned flange at 31 for stiffness and also is provided with a vertically adjustable guard 32 extending upwardly in cylinder form and preferably spaced from the upper face of the disc 21. This guard 32 is provided for the purpose of preventing the legs, head and neck of the fowl from being caught between the disc and the side wall of the member 10, and it is made adjustable vertically on the brackets 33 so as to vary the width of the slot 34. This slot 34 permits feathers and water etc. to escape from the disc as it is rotated.

The disc is provided with a plurality of vertical or upwardly projecting rubbing members which may take the form of the fingers 36, or may be in the form of flanged paddles or the like which will rub the bird and throw it outwardly against the stationary fingers 41, 42 and 43 by centrifugal force.

These inwardly projecting rubbing or fowl engaging members 41, 42 and 43 are provided on the inside of the upper portion of the cylinder, and these rubbing members also furnish rubbing and picking action to the birds deposited within the cylinder. For simplicity, fewer stationary fingers are shown than may actually be used. It is also to be noted that in the embodiment shown, the top row of fingers 43 are larger than the other fingers of the machine.

We preferably provide means for directing a water spray through the center of the machine and down the walls, as illustrated at 44, and water for this ring reaches the ring through the hose connection 46.

The upper end of the machine preferably is covered by means of the annular member shell 47 which has an opening 48 therein at the center thereof, and which preferably slopes inwardly to the center as illustrated in order to direct the birds and the water from them into the machine.

The birds may be removed from the machine from the top by hand or by any suitable mechanism, but we preferably provide a curved door, illustrated at 51, for this purpose. This door is hinged, as at 52, and is latched in closed position by means of a latch 53. A spring 52a is provided to urge the door into a normally open position. This door may be opened or unlatched manually or may be controlled by a timing mechanism to open automatically after a timed interval, as will be described later.

We preferably provide a chute, such as illustrated at 43, and this chute may have a retarder plate, illustrated at 56, for retarding discharge movement of the birds from the chute. It is also provided with a bumper, as illustrated at 57, so that when the door swings open, the movement of the door is checked by the bumper.

The latch mechanism is better shown in Figures 5, 6 and 7 and is partially contained in a water-proof box 70. The mechanism includes a vertically movable bar 71 which is guided by means of two guide plates 72 and 73 which have openings therethrough to permit the rod to slide up and down therein, and the rod is provided with a sloping front face, as illustrated at 74, so that when the latch bar 76 slides into the recess afforded by the striker plate 77, and the guide 73, the holding bar will be lifted. The latch bar pushes the holding bar 71 up until the latch bar is in engaged position and the holding bar 71 thereupon drops behind the latch bar to hold the door closed. The member 78 is a knob attached to the end of the latch bar 76. It should be here noted that, during automatic operation, the sloping front face 74 has no function, since the holding bar is normally up when the door is closed.

The holding bar 71 may be raised by the solenoid 79 and actuation of this solenoid is accomplished by means of the timer, illustrated at 81, which is a single cycle automatic-reset interval timer; other timing devices might be used. When the selected interval of time has expired, a contact is closed within the timer in accordance with the construction of such well known devices, and the electrical circuit is completed through the solenoid 79 to raise the holding bar 71 and thus release the door. The door is spring loaded, as illustrated at 52a, so that it immediately swings outwardly and the centrifugal motion of the birds causes them to be discharged through the door and into the chute 54.

The switch 82 serves to disconnect the entire control circuit from the power supply when the device is not in operation, and the signal light 83 indicates whether or not the circuit is operative. To recycle the timer for repetitive, we have provided a plunger actuated switch 84. A spring loaded right angle lever 85 is positioned in the control box adjacent this switch. Extending downwardly from this lever is a rod 86 which includes an outwardly extending ear 87. When the door is closed, the ear 87 is struck by the latch bar 76, which turns the rod and lever 85, closing the switch and thereby recycling the timer 81.

In operation, the birds are scalded in any well known manner and the door of the picker is closed. This actuates the timing mechanism 81 which is set for any desired number of seconds of operation. During the timed operating period, the solenoid is de-energized and the holding bar 71 is dropped, which latches the door in its closed position.

After a lapse say of 18 seconds, or any selected time interval, the actuating circuit of the timer 81 will be closed to energize the solenoid 79, and the solenoid 79 will raise the holding bar 71 to its upper position, releasing the latch bar 76 and permitting the door to swing open.

In operating the machine, as soon as the door has been closed, the scalded birds are immediately dropped, one or several at a time, according to the capacity of the machine, into the interior of the machine. The rotating rubbing members will impart a spinning motion to the birds which will, by centrifugal force, throw and force the birds toward the outer periphery of the spinning member and against the inwardly projecting stationary rubbing members. The spinning motion imparted by the upwardly projecting rubbing members also causes the birds to be carried around inside the device, during which action the radially projecting or stationary rubbing members also rub the birds as they tend to be carried around by the bottom rubbing members. The result is that the free rotation of the birds is prevented, and both sets of rubbing members are effective to rub all portions of the birds evenly and remove the feathers.

The feathers are thrown outwardly by centrifugal force and strike the inner wall of the cylinder and are floated down along the wall by the flow of water from the pipe 44, to be discharged on the floor beneath the machine.

After the birds have been rotated in this manner a predetermined length of time, determined and selected by the operator, the curved door is opened, as previously stated, and the birds are discharged into the chute where they may then fall into a cooling tank or onto a rack or the like as desired.

The picking action is remarkably complete in a short period of time, and pin feathers and even wing feathers are removed, almost completely if not completely. A much greater picking surface is utilized than in the pickers known in the art.

Although we have described a specific embodiment of our invention, it is apparent that modifications thereof may be made by those skilled in the art. Such modifications may be made without departing from the spirit and scope of our invention as set forth in the appended claims.

We claim as our invention:

1. A poultry picking machine comprising a stationary cylindrical casing, a rotatable disc adjacent one end of said cylindrical casing, a shaft operatively connected to said disc for supporting and rotating the same, a plurality of resilient picking fingers extending inwardly from a major portion of the interior surface of said cylindrical casing and a plurality of resilient picking fingers extending from a major portion of said disc toward the interior of said cylindrical casing, whereby feathered poultry placed in said machine is simultaneously, continuously rotated and defeathered by said resilient picking fingers.

2. A poultry picking machine comprising a stationary vertically disposed cylindrical casing having the upper end thereof open to receive feathered poultry, a horizontally disposed rotatable circular platform adjacent the lower end of said cylindrical casing, circular platform supporting and rotating means operatively connected to said circular platform for supporting and rotating the same, a plurality of resilient elongated poultry engaging members extending inwardly from a major portion of the lower portion of the interior surface of said cylindrical casing, said cylindrical casing-supported resilient poultry engaging members being adapted to rotate the poultry about the axes thereof, and a plurality of resilient picking fingers extending from a major portion of said circular platform adjacent the periphery thereof toward the interior of said cylindrical casing, said last-named resilient fingers being adapted to maintain the poultry in said machine in contact with said cylindrical casing-supported resilient poultry engaging members and remove the feathers from said poultry as the same are rotated about the axes thereof.

3. A poultry picking machine as set forth in claim 2 wherein said resilient picking fingers consist of thin elongated members, each terminating at the outer end thereof in a transversely extending surface bounded by sharp edges.

4. A poultry picking machine as set forth in claim 2 having a transversely extending plate member secured to said cylindrical casing adjacent the upper end thereof for supporting feathered poultry to be fed into said picking machine.

5. A poultry picking machine comprising a stationary vertically disposed casing having the upper end thereof open to receive feathered poultry, a horizontally disposed rotatable circular platform adjacent the lower end of said casing, circular platform supporting and rotating means operatively connected to said circular platform for supporting and rotating the same, a plurality of resilient elongated poultry engaging members extending inwardly from a major portion of the lower portion of the interior surface of said casing, said poultry engaging members being adapted to rotate the poultry about the axes thereof, a plurality of resilient picking fingers extending from a major portion of said circular platform adjacent the periphery thereof toward the interior of said casing, said casing having an opening in the side thereof extending upwardly from a point adjacent said resilient picking fingers, a closure for said side opening operable to permit defeathered poultry to be ejected by said resilient picking fingers through said opening, resilient means operably connected to said closure for normally maintaining the same in an opened position, movable latch means for retaining said closure in a closed position, and time responsive means operably connected to said latch means for moving said latch means to release said closure and permit said resilient means to open the same.

6. A poultry picking machine comprising a stationary vertically disposed cylindrical casing having the upper end thereof open to receive feathered poultry, a horizontally disposed rotatable disc adjacent the lower end of said cylindrical casing, disc rotating means operatively connected to said disc for supporting and rotating the same, a plurality of resilient picking fingers extending inwardly from a major portion of the lower portion of the interior surface of said cylindrical casing, said cylindrical casing-supported resilient fingers being adapted to rotate the poultry about the axes thereof, a plurality of resilient picking fingers extending from a major portion of said disc adjacent the periphery thereof toward the interior of said cylindrical casing, said last-named resilient fingers being adapted to maintain the poultry in said machine in contact with said cylindrical casing-supported resilient fingers and remove the feathers from said poultry as the same is rotated about the axes thereof, said cylindrical casing having an opening in the side thereof extending upwardly from a point adjacent the upper ends of said disc-supported resilient fingers, and a closure on said cylindrical casing for said side opening therein operable to permit defeathered poultry to be ejected through said opening.

7. A poultry picking machine as set forth in claim 6 having resilient means operatively connected to said closure for normally maintaining said closure in an open position, movable latch means for retaining said closure in a closed position and time responsive means operatively connected to said latch means for moving said latch means to release said closure and permit said resilient means to open the same.

8. A poultry picking machine as set forth in claim 6 having a chute extending outwardly from the exterior of said cylindrical casing at the side opening therein for receiving defeathered poultry ejected through said opening and a retarding gate extending across said chute for retaining defeathered poultry therein, said gate being pivotally connected to said chute to permit the removal of defeathered poultry from said chute.

References Cited in the file of this patent

UNITED STATES PATENTS

| Number | Name | Date |
|---|---|---|
| 686,576 | Blache | Nov. 12, 1901 |
| 859,842 | Robinson | July 9, 1907 |
| 2,472,468 | Digby | June 7, 1949 |
| 2,523,302 | Hunt | Sept. 26, 1950 |
| 2,596,443 | Sharp | May 13, 1952 |
| 2,603,831 | Sharp | July 22, 1952 |
| 2,635,284 | Hunt | Apr. 21, 1953 |